United States Patent
Ji et al.

(10) Patent No.: US 11,445,009 B1
(45) Date of Patent: Sep. 13, 2022

(54) MANAGING PROPRIETARY STRUCTURED OBJECTS

(71) Applicant: INTERNATIONAL BUSINESS MACHINES CORPORATION, Armonk, NY (US)

(72) Inventors: Mo Ji, Beijing (CN); Peng Hui Jiang, Beijing (CN); Da L. Huang, Beijing (CN); Li Na Nn Wang, Beijing (CN); Kun Song, Beijing (CN); Ya Nan Mo, Beijing (CN); Feng Zhang, Beijing (CN); Li Jun Bj Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/499,994

(22) Filed: Oct. 13, 2021

(51) Int. Cl.
*H04L 67/06* (2022.01)
*H04L 67/306* (2022.01)
*H04L 67/1097* (2022.01)
*H04L 67/51* (2022.01)

(52) U.S. Cl.
CPC .......... *H04L 67/06* (2013.01); *H04L 67/1097* (2013.01); *H04L 67/306* (2013.01); *H04L 67/51* (2022.05)

(58) Field of Classification Search
None
See application file for complete search history.

(56) References Cited

U.S. PATENT DOCUMENTS

| | | | |
|---|---|---|---|
| 8,069,349 B1 | 11/2011 | Israel et al. | |
| 8,468,244 B2 * | 6/2013 | Redlich | G06Q 10/06 715/255 |
| 8,650,645 B1 | 2/2014 | Thompson et al. | |
| 8,832,308 B2 | 9/2014 | Tsutsui | |
| 8,898,219 B2 * | 11/2014 | Ricci | H04M 3/44 709/203 |

(Continued)

FOREIGN PATENT DOCUMENTS

CN 105989304 A 10/2016

OTHER PUBLICATIONS

Giorgos et al., "Multitenant Access Control for Cloud-Aware Distributed Filesystems", Jun. 6, 2017, IEEE Transactions on Dependable and Secure Computing (vol. 16, Issue: 6, pp. 1070-1085) (Year: 2017).*

(Continued)

*Primary Examiner* — Davoud A Zand
(74) *Attorney, Agent, or Firm* — Cantor Colburn LLP; Teddi Maranzano (57) ABSTRACT

Aspects of the invention include receiving, from a first client, a first object, determining a first file format for the first object, wherein the first file format is operable to run on a first platform, generating a catalog for the first object, wherein the catalog comprises data associated with the first object, and wherein the catalog for the first object is stored on a first server, receiving, from a second client, a request to access the data associated with the first object, determining a second platform operated by the second client, converting, on a second server, the first file format for the first object to a second file format, the second file format operable to run on the second platform, and transmitting the first object in the second file format to the second client.

20 Claims, 8 Drawing Sheets

(56) References Cited

U.S. PATENT DOCUMENTS

| | | | |
|---|---|---|---|
| 9,129,120 B2 | 9/2015 | Garcia et al. | |
| 11,200,037 B1* | 12/2021 | Mann | G06F 16/24522 |
| 11,243,792 B2* | 2/2022 | Zhang | G06F 9/45558 |
| 2014/0359047 A1 | 12/2014 | Lee et al. | |
| 2017/0168903 A1* | 6/2017 | Dornemann | G06F 11/2097 |

OTHER PUBLICATIONS

IBM, "Transferring a SAVF from one IBM i to another IBM i Using FTP," URL: https://www.ibm.com/support/pages/transferring-savf-one-ibm-i-another-ibm-i-using-ftp. Retrieved: Jun. 9, 2021, 3 pages.

* cited by examiner

MANAGING PROPRIETARY STRUCTURED OBJECTS

BACKGROUND

The present invention generally relates to data management, and more specifically, to managing proprietary structured objects for a hybrid-cloud environment.

Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud services are provided (e.g., virtual server space, network connections, bandwidth, IP addresses, load balancers, etc). Platform-as-a-service in the cloud refers to a set of software and product development tools hosted on the cloud for enabling developers (i.e., a type of cloud service consumer) to build applications and services using the cloud. Software-as-a-service refers to applications that are hosted on and available on-demand by cloud service consumers via the cloud. Managed Services refers to services such as backup administration, remote system administration, application management, security services, etc. that are enabled by managed service providers for any Cloud services.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

The cloud is rapidly being adopted by business and IT users as a way to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management whom are worried about considerations such as, for example, managing costs, chargeback, capacity and resources from the result of unrestrained/unplanned cloud expansion.

SUMMARY

Embodiments of the present invention are directed to managing proprietary structured files in a hybrid-cloud environment. A non-limiting example computer-implemented method includes receiving, from a first client, a first object, determining a first file format for the first object, wherein the first file format is operable to run on a first platform, generating a catalog for the first object, wherein the catalog comprises data associated with the first object, and wherein the catalog for the first object is stored on a first server, receiving, from a second client, a request to access the data associated with the first object, determining a second platform operated by the second client, converting, on a second server, the first file format for the first object to a second file format, the second file format operable to run on the second platform, and transmitting the first object in the second file format to the second client.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provides systems and methods for accessing and securing proprietary structured files operating under different platforms in a hybrid-cloud environment. Aspects include encrypting the structured files, using a public key, and storing the files in a hybrid-cloud environment that includes a public and private cloud. In a public cloud environment, the cloud infrastructure is made available to the general public or a large industry group and is owned by an organization selling cloud services. In a private cloud environment, the cloud infrastructure is operated solely for an organization. It may be managed by the organization or a third party and may exist on-premises or off-premises. In one or more embodiments of the invention, an organization can store structured files in this hybrid cloud where the data of each file is stored (and encrypted) in the private cloud environment and a catalog of the structured files can be available on the public cloud environment. Each of the structured files can include an access control list (ACL) that designates the access rights and permissions for the structured file. The ACL specifies both a subject and an operation for the structured file. For example, a subject can be a specified user and the operation can be permissions such as read, write, edit, and the like.

In one or more embodiments of the invention, the structured files are proprietary in that the files can only be operated by a specific platform. Proprietary structured files refer to file formats for a company, organization, and/or individual that contains data that is ordered and stored according to a particular encoding-scheme and is designed by the company or organization to be secret such that the decoding and interpretation of the stored data is accomplished only with a particular software or hardware that the company has developed. Because of the breadth of the proprietary file formats, an organization storing files in a cloud environment could find it difficult to allow individuals in the organization and/or outside the organization to access the data for each and every file (object) having a proprietary format. Further, given the size of some of these files, downloading the file from a cloud environment can take considerable time for a client computer accessing the cloud. If the client computer does not have the appropriate software platform to open the proprietary file, this downloading time would be wasted.

One or more embodiments of the present invention address the above mention drawbacks of storing proprietary structured files in a hybrid cloud computing environment by providing a system environment and associated methodology that allows for secure access to these files using different platforms. The cloud computing environment can include a public cloud which includes a directory of files available and encrypted in the private cloud where the files can be proprietary structured files. When being accessed by a client computer, the accessing platform can be determined and the structured file in an appropriate format can be sent to the client computer. The cloud computing environment can utilize a public key/private key encryption scheme for securing the files in the private cloud as well as an access control list (ACL). A client computer can upload a structured file and encrypt, using a public key, the file which is then stored in the cloud environment. When a second client computer, typically operating a second platform, attempts to access the file, the cloud computing environment determines the second client computer is operating this second platform and returns the file in a format that can be accessed using this second platform. The encrypted file is transmitted to the second client computer which utilizes a private key to unencrypt the file and access using the second platform.

Figure 1:
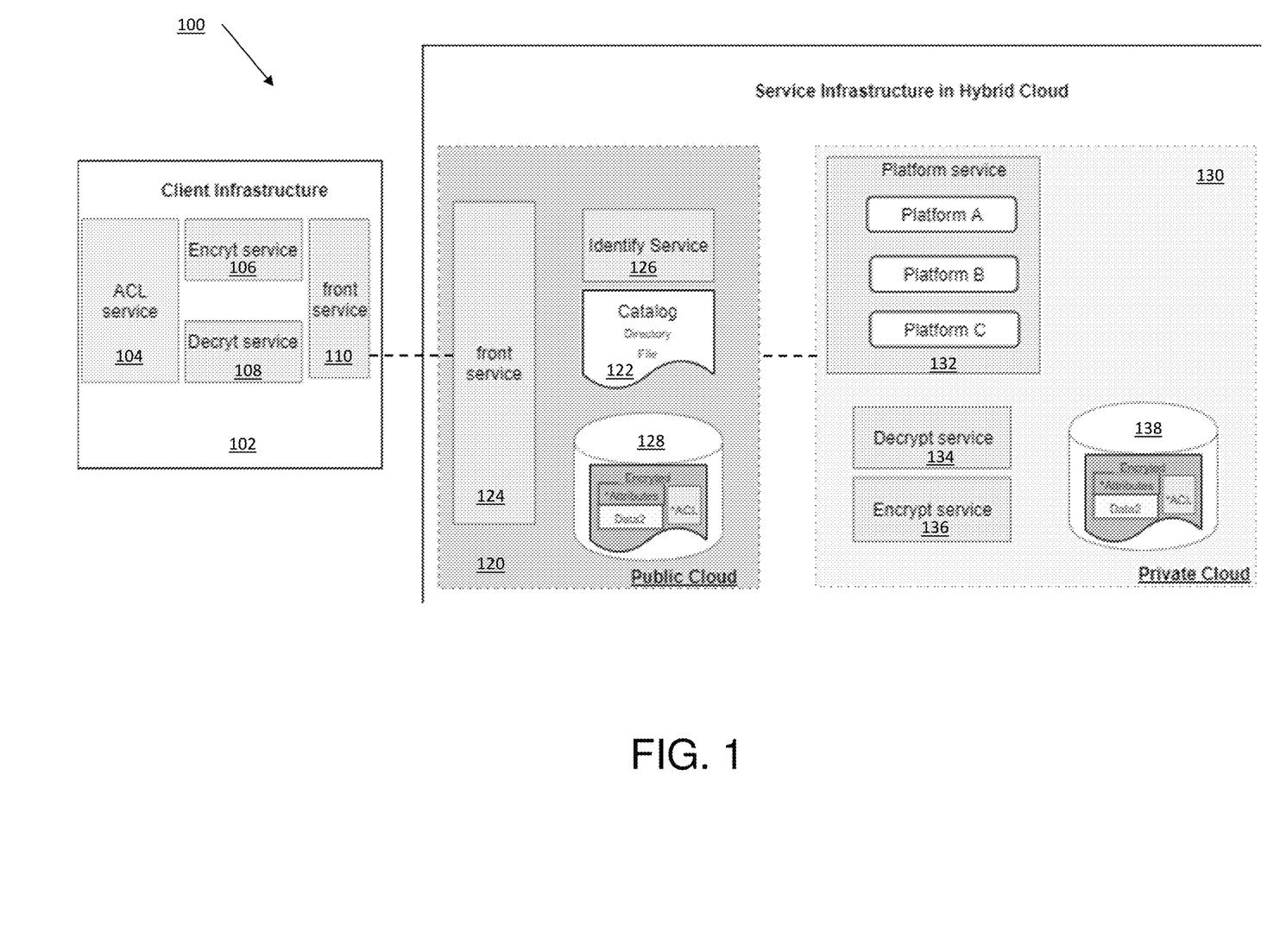
FIG. 1 depicts a system for managing proprietary structured files in a hybrid-cloud environment according to one or more embodiments of the invention.

FIG. 1 depicts a system for managing proprietary structured files in a hybrid-cloud environment according to one or more embodiments of the invention. The system 100 includes a client infrastructure 102 which can include any number of physical and/or virtual computers that are able to access the cloud computing environment. The cloud computing environment includes both a public cloud 120 and a private cloud 130. The public cloud 120 and private cloud 130 environment can be hosted on separate servers, the same server, and/or a mixture of different servers. The client infrastructure 102, for ease of description, can be, for example, a computing device that executes a platform that is utilized in the client organization. The platform can be a software application, an operating system, and/or any other platform. This computing device 102 includes an ACL service 104 that can be stored local to the computing device 102 or can be stored on a server including the server hosting the public cloud 120 and/or private cloud 130. The computing device 102 can include an encryption 106 and a decryption service 108 that can utilize various encryption techniques for proprietary structured files. Also, the computing device 102 can include a front end service 110 that can be utilized for accessing the cloud computing environment. The front end service 110 can be, for example, a client portal that provides access to public 120 and private 130 cloud. The public cloud 120 operates a similar front end service 124 which can be utilized for accessing information from the public cloud 120. The public cloud 120 can include a storage 128 and an identifying service module 126 for determining a platform that operates any of the stored structured files within the private cloud 130. Further, a catalog 122 (file directory) is maintained on the public cloud 120 which allows for access to information about the structured files stored on the private cloud 130.

In one or more embodiments of the invention, the private cloud 130 includes a platform service module 132, an encryption 134 and decryption 132 service, and a storage 138 for storing the structured files. Typically, the structured files are stored in the private cloud in an encrypted format using the public key from the client computer 102. The platform service module 132 is utilized to access and convert structured files from one platform to another platform as needed for access by other client computers accessing the cloud.

Figure 2:
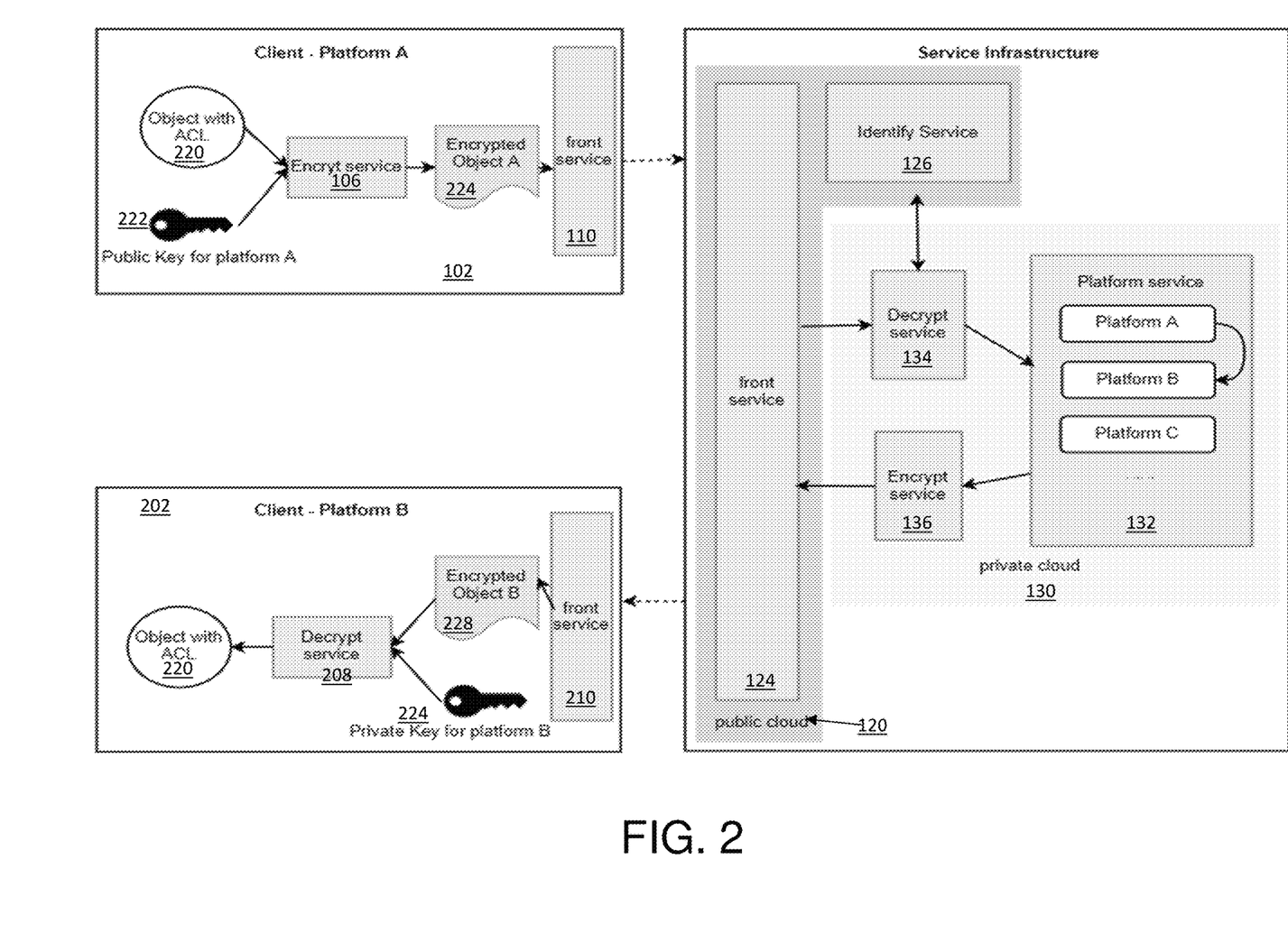
FIG. 2 depicts the system for managing proprietary structured files in the hybrid-cloud environment according to one or more embodiments of the invention.

FIG. 2 depicts the system for managing proprietary structured files in the hybrid-cloud environment according to one or more embodiments of the invention. For ease of illustration and consistency, the same numbering scheme will be used for referencing the same components from FIG. 1. Further, the system 200 depicts a process flow for a first client device 102 (utilizing platform A) uploading a structured file to the cloud environment and a second client device 202 (utilizing platform B) accessing the structured file. In one or more embodiments of the invention, the system 200 includes a first client device 102 operating platform A on the device 102. The client device 102 includes a proprietary structured file (object) 220 which includes an access control list designating access rights to the file. The object 220 is encrypted, using a public key 222, to create an encrypted object 224 which is sent to the cloud environment for storage. The second client 202 (utilizing platform B) then is requesting access to the object 220. However, the second client 202 does not utilize platform A which is the platform for opening this structured file 220. The identify service module 126 determines the platform being utilized by the requesting client 202 and communicates this platform type to the platform service module 132 on the private cloud 130. The platform service 132 utilizes a stored platform A to convert the object 220 from a file type for platform A to a file type for platform B. This converted file type is then encrypted using the public key and forwarded to the second client device 202. The second client device 202 then receives the encrypted object in file type for platform B 228 which is then decrypted using a decryption service 208 along with a private key 224. At this point, the object 220 is accessible by the second client device 202 in a file format that is appropriate for platform B. The second client device 202 can freely access the object 220 based on the access control list has designated this second client 202 as having appropriate access.

In one or more embodiments of the invention, the platform service module 132 converts the proprietary structured object 220 from a file accessible by platform A to a file accessible by platform B by first converting the object 220 to a common type file. Then, using platform B in the platform service module 132 to then convert the common type file to a file type accessible by platform B. This can be implemented using the format Zip are a command type while tar, gz, and other compression type are specific type for compressed data. The tar file can be converted to common type zip and then can be easily converted to another format.

Figure 3:
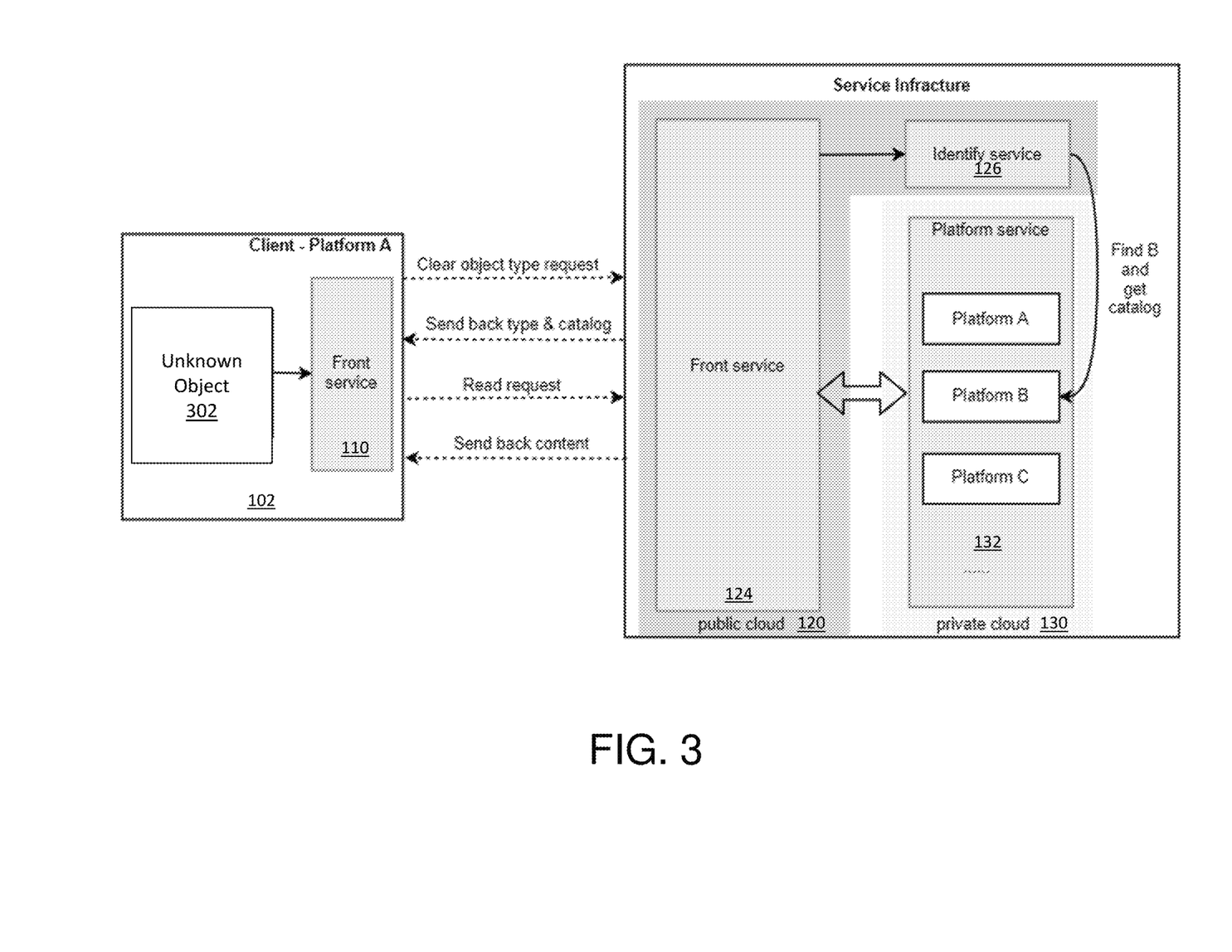
FIG. 3 depicts the system for managing proprietary structured files in the hybrid-cloud environment according to one or more embodiments of the invention.

FIG. 3 depicts the system for managing proprietary structured files in the hybrid-cloud environment according to one or more embodiments of the invention. For ease of illustration and consistency, the same numbering scheme will be used for referencing the same components from FIG. 1. Further, the system 300 depicts a process flow for a first client device 102 (utilizing platform A) uploading an unknown object 302 being an unknown file type to the cloud environment for the file to be converted so that the client device 102 can access the object 302 using platform A. In one or more embodiments of the invention, the system 300 includes the client device 102 having a front end service 110 which communicates with a front end service 124 in the public cloud 120. The client device 102 may be trying to access an object 302 having an unknown or inaccessible file type through platform A. In one or more embodiments of the invention, the client device 102 transmit a request to the cloud environment to access the unknown object 302. The cloud environment uses the identify service module 126 on the public cloud 120 to determine the object type and what platform can access the object. In this example, the unknown object 302 can be accessed by platform B in the platform service module 132 on the private cloud 130. The platform B can access and open the object 302 and send the object type and a catalog to the client device 102. The catalog presents information on the contents of the structured object 302. The client device 102 can request access to one or more items in the unknown object 302 The requested items from the catalog can be converted to a common type and transmitted to the client device 102 for access using platform A on the client device 102.

Figure 4:
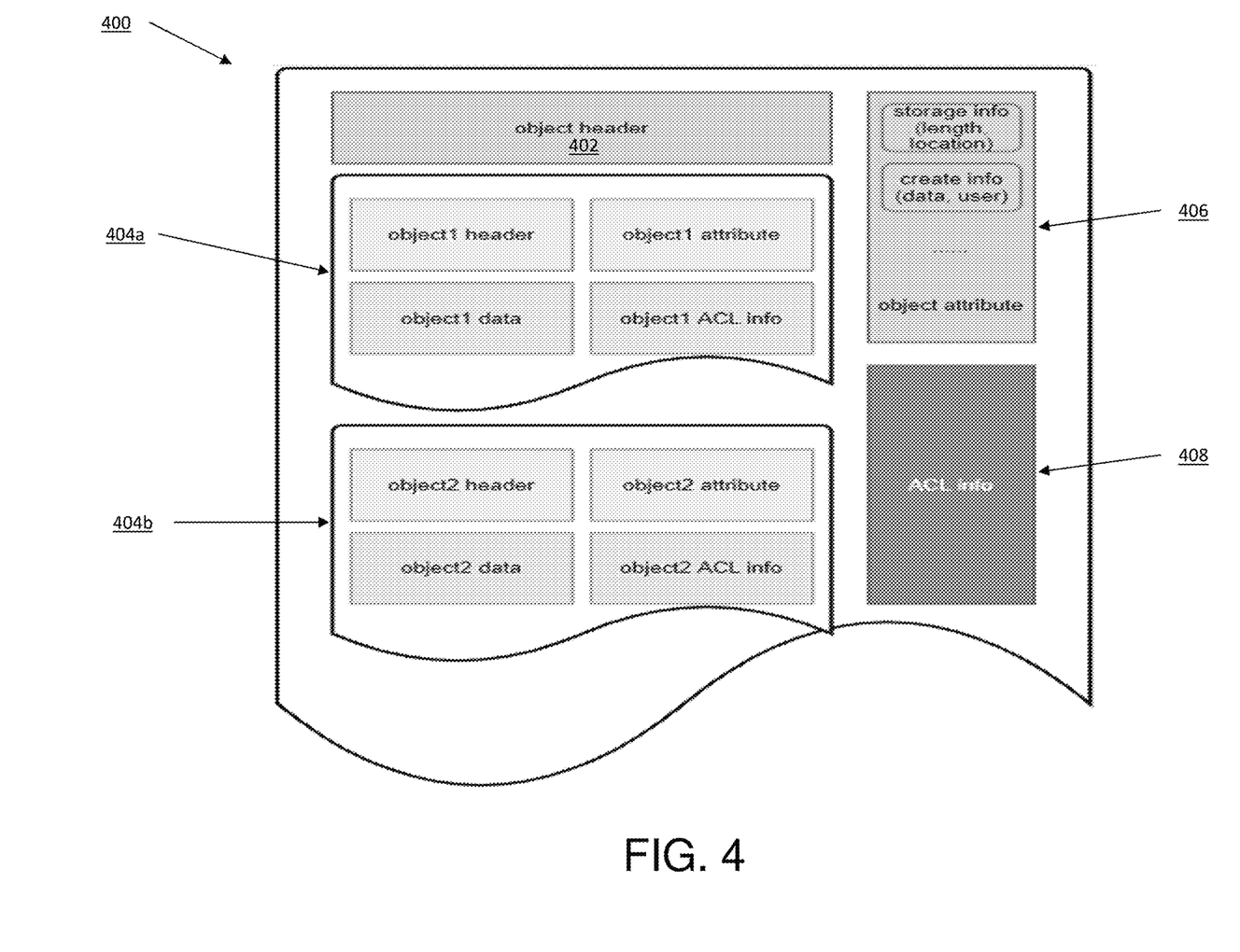
FIG. 4 depicts an exemplary structured object according to one or more embodiments of the invention.

FIG. 4 depicts an exemplary structured object according to one or more embodiments of the invention. The structured object 400 includes a header 402 along with items 404a, 404b stored in the structured object 400. The items 404a, 404b include associated headers, attributes, data, and/or ACL information. In one or more embodiments of the invention, the catalog 122 (from FIG. 1) can depict information regarding the items 404a, 404b described herein as well as any other information associated with structured object 400. The structured object 400 also includes object attributes 406 for the object 400 as a whole as well as an ACL 408 dictating access rights for the object 400. As described in the process flows for FIG. 2 and FIG. 3, the cloud environment includes a platform service module 132 that is operable to access the object 400 and to send catalog descriptions of the items 404a, 404b for access by a client device 102 on the public cloud 120. When a client device that does not have an appropriate platform to access the object 400 or simply one or more items (data) 404a, 404b for the object, the cloud computing environment can convert the object 400 and/or items 404 and send to the requesting client device.

Figure 7:
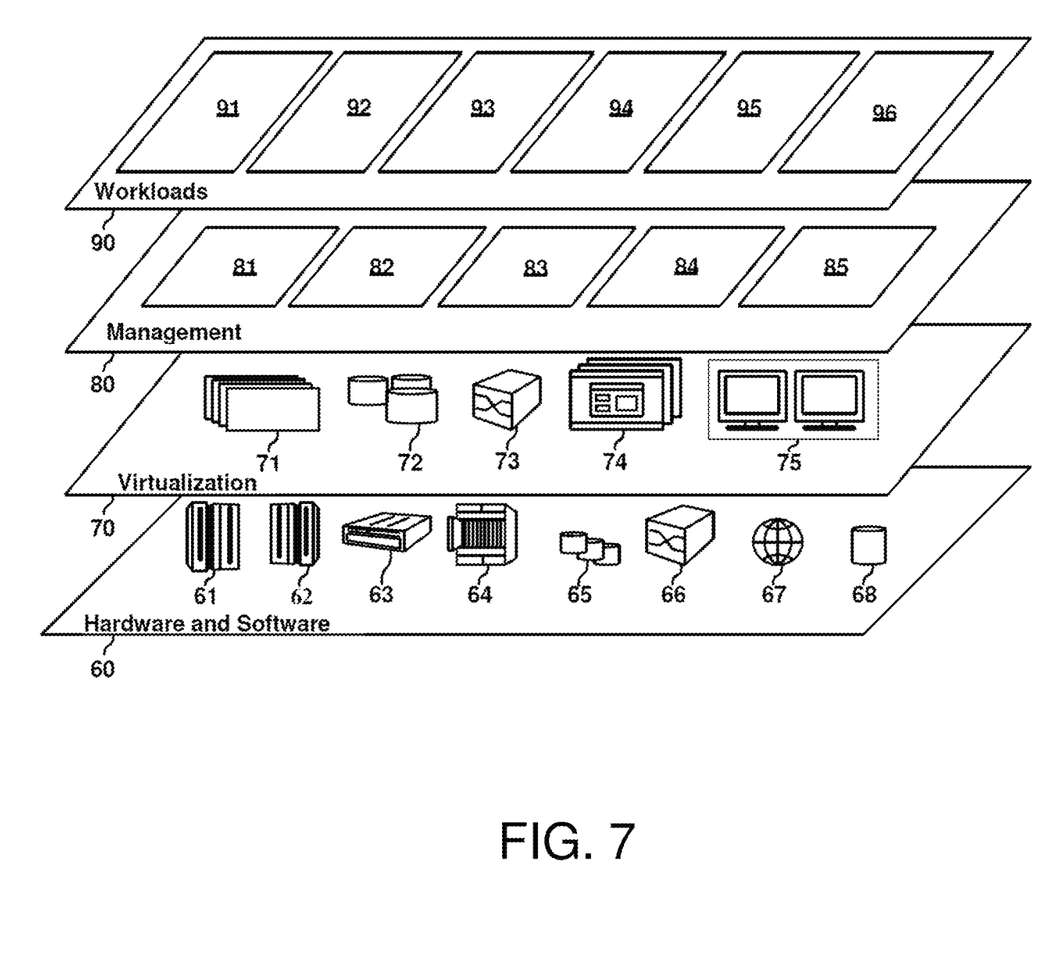
FIG. 7 depicts abstraction model layers according to one or more embodiments of the present invention.
Figure 8:
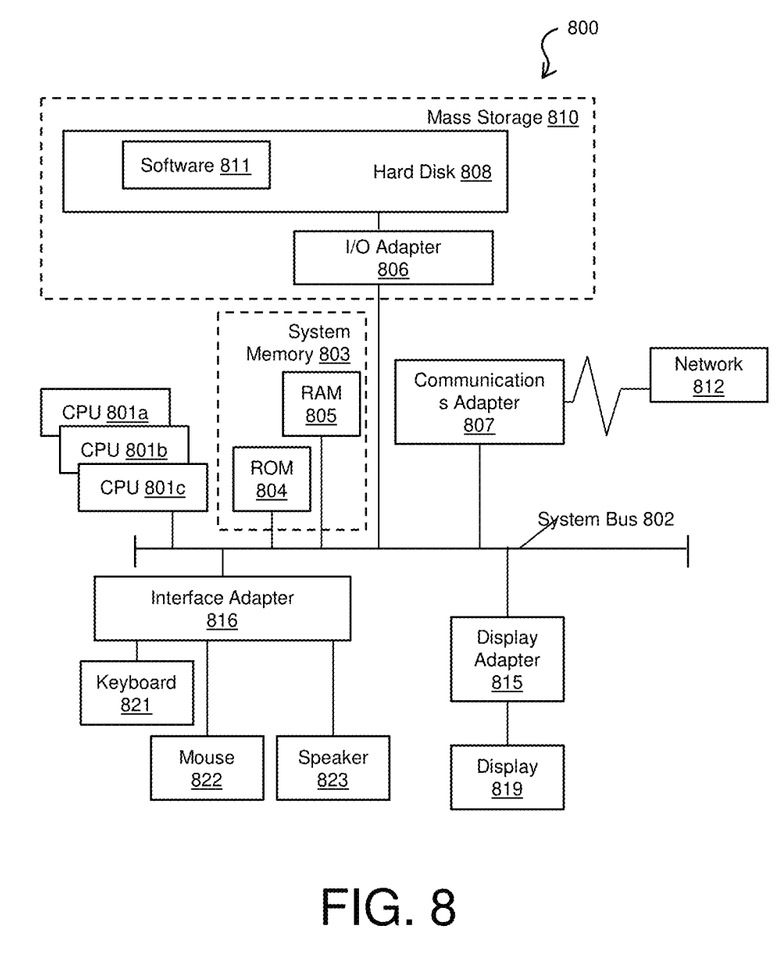
FIG. 8 depicts a computer system is generally shown in accordance with an embodiment.

In one or more embodiments of the invention, the client device (client infrastructure) 102 and any of the components on the public cloud 120 and the private cloud 130 such as the identify service module 126, platform server 132, and the decrypt 134, and encrypt 136 services can be implemented on the processing system 800 found in FIG. 8. Additionally, the cloud computing system 50 can be in wired or wireless electronic communication with one or all of the elements of the systems 100, 200, 300. Cloud 50 can supplement, support or replace some or all of the functionality of the elements of the systems 100, 200, 300. Additionally, some or all of the functionality of the elements of systems 100, 200, 300 can be implemented as a node 10 (shown in FIGS. 6 and 7) of cloud 50. Cloud computing node 10 is only one example of a suitable cloud computing node and is not intended to suggest any limitation as to the scope of use or functionality of embodiments of the invention described herein.

Figure 5:
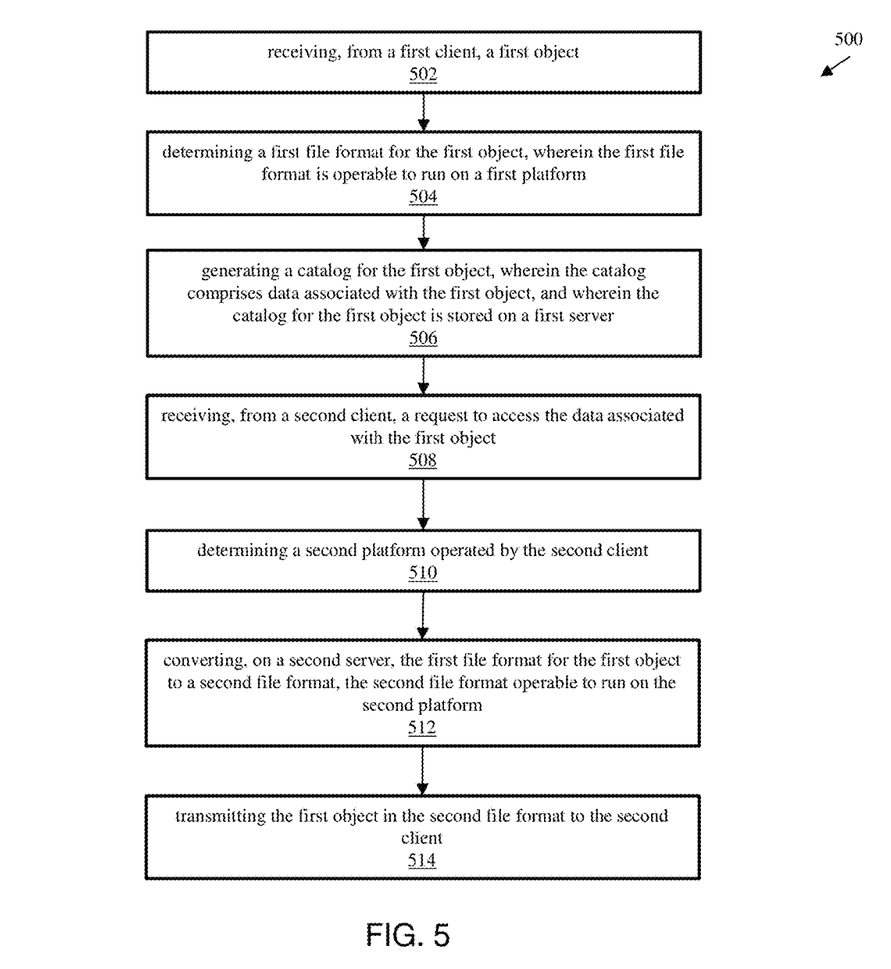
FIG. 5 depicts a flow diagram of a method for managing proprietary structured files in the hybrid-cloud environment according to one or more embodiments of the invention.

FIG. 5 depicts a flow diagram of a method 500 for managing proprietary structured files in the hybrid-cloud environment according to one or more embodiments of the invention. At least a portion of the method 500 can be executed, for example, by the one or more servers such as the public cloud 120 and/or private cloud 130 shown in FIG. 1. The method 500 includes receiving, from a first client, a first object, as shown in block 502. The first object can be, for example, a proprietary structured file. At block 504, the method 500 includes determining a first file format for the first object, wherein the first file format is operable to run on a first platform. The first platform can be any or a combination of proprietary software, an operating system, and the like. The method 500, at block 506, includes generating a catalog for the first object, wherein the catalog comprises data associated with the first object, and wherein the catalog for the first object is stored on a first server. The first server can be a public cloud environment where the catalog with the data for the first object is available to be selected. At block 508, the method 500 includes receiving, from a second client, a request to access the data associated with the first object. This second client can analyze the catalog to determine what data is needed from the first object despite the second client operating a different platform. At block 510, the method 500 includes determining a second platform operated by the second client. Also, at block 512, the method 500 includes converting, on a second server, the first file format for the first object to a second file format, the second file format operable to run on the second platform. And at block 514, the method 500 includes transmitting the first object in the second file format to the second client.

Additional processes may also be included. It should be understood that the processes depicted in FIG. 5 represent illustrations, and that other processes may be added or existing processes may be removed, modified, or rearranged without departing from the scope and spirit of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
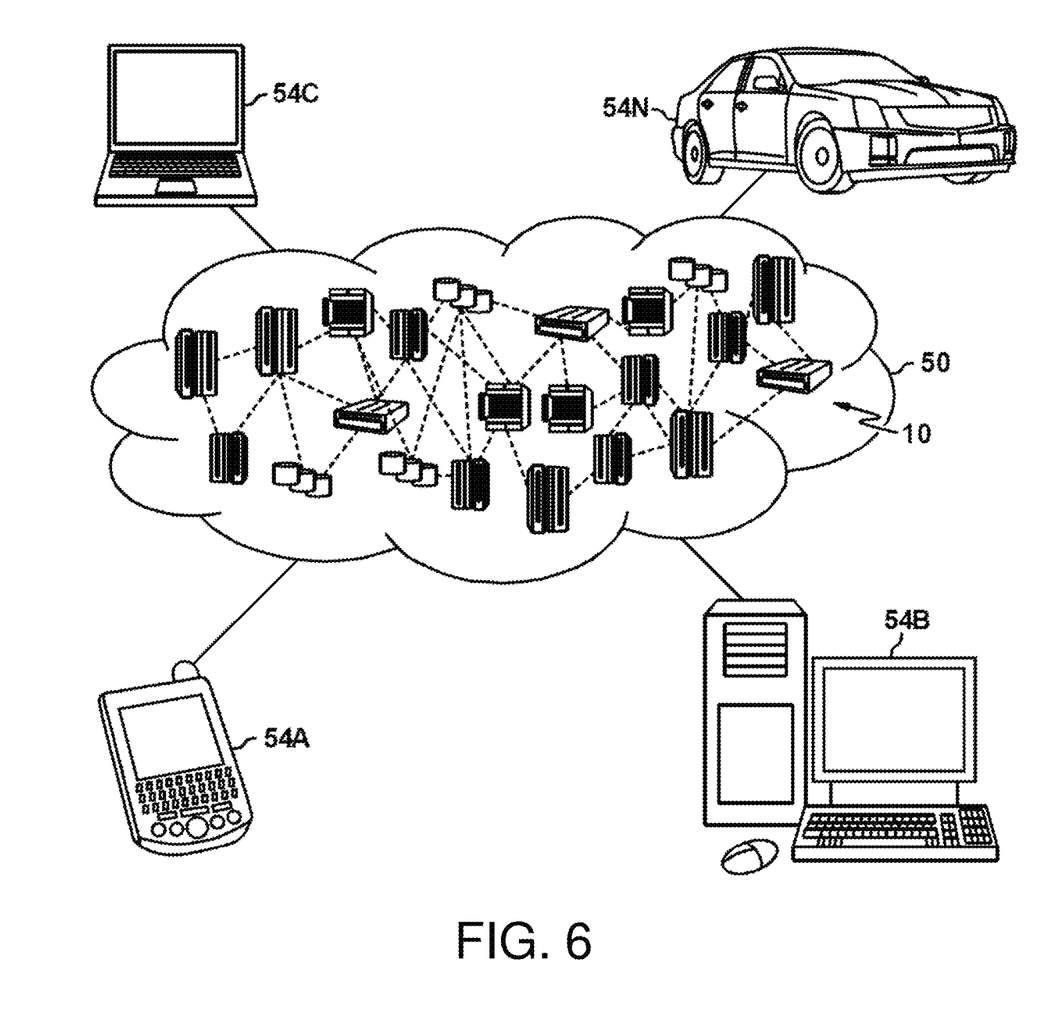
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing proprietary structured files in the hybrid-cloud environment 96.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801$a$, 801$b$, 801$c$, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising: receiving, from a first client, a first object;
   determining a first file format for the first object, wherein the first file format is operable to run on a first platform;
   generating a catalog for the first object, the first object being encrypted, wherein the catalog comprises data associated with the first object, and wherein the catalog for the first object is stored on a first server;
   receiving, from a second client, a request to access the data associated with the first object that is encrypted, in response to presenting a catalog description of the data for the first object in the catalog to the second client;
   determining a second platform operated by the second client;
   converting, on a second server, the first file format for the first object to a second file format, the second file format operable to run on the second platform;
   transmitting the first object in the second file format to the second client;
   wherein converting the first file format for the first object to a second file format comprises:
      identifying, by a platform service module on the second server, the first platform associated with the first object;
      operating the first platform, on the second server, to access the first object; and
      converting the first file format of the first object to a common file format.

2. The computer-implemented method of claim 1, wherein the determining the first file format for the first object comprises:
   decrypting, on the second server using a public key, the first object; and
   identifying, by a platform service module on the second server, the first platform associated with the first object.

3. The computer-implemented method of claim 1, wherein generating the catalog for the first object comprises:
   determining the first platform for the first object;
   operating the first platform on the second server to access the first object;
   analyzing the first object through the first platform to determine the data associated with the first object; and
   storing the data associated with the first object in the catalog on the first server.

4. The computer-implemented method of claim 1, further comprising:
   responsive to receiving the request to access the data associated with the first object:
      determining access rights of the first object, wherein the first object comprises an access control list; and
      determining that the second client can access the first object based on the access control list.

5. The computer-implemented method of claim 1, wherein converting the first file format for the first object to a second file format comprises:
   operating the second platform, on the second server, to access the common file format; and
   converting, using the second platform, the common file format to the second file format.

6. The computer-implemented method of claim 1, wherein the first server comprises a public cloud environment.

7. The computer-implemented method of claim 1, wherein the second server comprises a private cloud environment.

8. A system comprising: a memory having computer readable instructions; and one or more processors for executing the computer readable instructions, the computer readable instructions controlling the one or more processors to perform operations comprising:
   receiving, from a first client, a first object;
   determining a first file format for the first object, wherein the first file format is operable to run on a first platform;
   generating a catalog for the first object, the first object being encrypted, wherein the catalog comprises data associated with the first object, and wherein the catalog for the first object is stored on a first server;
   receiving, from a second client, a request to access the data associated with the first object that is encrypted, in response to presenting a catalog description of the data for the first object in the catalog to the second client;
   determining a second platform operated by the second client;
   converting, on a second server, the first file format for the first object to a second file format, the second file format operable to run on the second platform;
   transmitting the first object in the second file format to the second client;
   wherein converting the first file format for the first object to a second file format comprises:
      identifying, by a platform service module on the second server, the first platform associated with the first object;
      operating the first platform, on the second server, to access the first object; and
      converting the first file format of the first object to a common file format.

9. The system of claim 8, wherein the determining the first file format for the first object comprises:
   decrypting, on the second server using a public key, the first object; and
   identifying, by a platform service module on the second server, the first platform associated with the first object.

10. The system of claim 8, wherein generating the catalog for the first object comprises:
    determining the first platform for the first object;
    operating the first platform on the second server to access the first object;
    analyzing the first object through the first platform to determine the data associated with the first object; and
    storing the data associated with the first object in the catalog on the first server.

11. The system of claim 8, wherein the operations further comprise:
    responsive to receiving the request to access the data associated with the first object:

determining access rights of the first object, wherein the first object comprises an access control list; and
determining that the second client can access the first object based on the access control list.

12. The system of claim 8, wherein converting the first file format for the first object to a second file format comprises:
operating the second platform, on the second server, to access the common file format; and
converting, using the second platform, the common file format to the second file format.

13. The system of claim 1, wherein the first server comprises a public cloud environment.

14. The system of claim 1, wherein the second server comprises a private cloud environment.

15. A computer program product comprising a non-transitory computer readable storage medium having program instructions embodied therewith, the program instructions executable by one or more processors to cause the one or more processors to perform operations comprising:
receiving, from a first client, a first object;
determining a first file format for the first object, wherein the first file format is operable to run on a first platform;
generating a catalog for the first object, the first object being encrypted, wherein the catalog comprises data associated with the first object, and wherein the catalog for the first object is stored on a first server;
receiving, from a second client, a request to access the data associated with the first object that is encrypted, in response to presenting a catalog description of the data for the first object in the catalog to the second client;
determining a second platform operated by the second client;
converting, on a second server, the first file format for the first object to a second file format, the second file format operable to run on the second platform;
transmitting the first object in the second file format to the second client;
wherein converting the first file format for the first object to a second file format comprises:
identifying, by a platform service module on the second server, the first platform associated with the first object;
operating the first platform, on the second server, to access the first object; and
converting the first file format of the first object to a common file format.

16. The computer program product of claim 15, wherein the determining the first file format for the first object comprises:
decrypting, on the second server using a public key, the first object; and
identifying, by a platform service module on the second server, the first platform associated with the first object.

17. The computer program product of claim 15, wherein generating the catalog for the first object comprises:
determining the first platform for the first object;
operating the first platform on the second server to access the first object;
analyzing the first object through the first platform to determine the data associated with the first object; and
storing the data associated with the first object in the catalog on the first server.

18. The computer program product of claim 15, wherein the operations further comprise:
responsive to receiving the request to access the data associated with the first object:
determining access rights of the first object, wherein the first object comprises an access control list; and
determining that the second client can access the first object based on the access control list.

19. The computer program product of claim 15, wherein converting the first file format for the first object to a second file format comprises:
operating the second platform, on the second server, to access the common file format; and
converting, using the second platform, the common file format to the second file format.

20. The computer program product of claim 15, wherein the first server comprises a public cloud environment, and wherein the second server comprises a private cloud environment.

* * * * *